UNITED STATES PATENT OFFICE.

ADOLF ISRAEL AND RICHARD KOTHE, OF ELBERFELD, GERMANY, ASSIGNORS TO FARBENFABRIKEN OF ELBERFELD CO., OF NEW YORK, N. Y.

RED AZO DYE AND PROCESS OF MAKING SAME.

SPECIFICATION forming part of Letters Patent No. 677,517, dated July 2, 1901.

Application filed February 25, 1901. Serial No. 48,740. (Specimens.)

*To all whom it may concern:*

Be it known that we, ADOLF ISRAEL and RICHARD KOTHE, doctors of philosophy, chemists, (assignors to the FARBENFABRIKEN OF ELBERFELD COMPANY, of New York,) residing at Elberfeld, Germany, have invented a new and useful Improvement in new Azo Dyes; and we hereby declare the following to be a clear and exact description of our invention.

In two applications for Letters Patent filed February 20, 1901, and bearing Serial Nos. 48,167 and 48,168, we have described the production of new, simple, and mixed guanidin derivatives of amidonaphthol sulfonic acids having the following general formula:

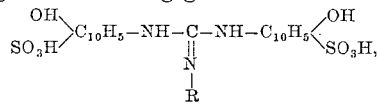

in which formula R means a hydrogen atom which can be replaced by a fatty or an aromatic radical, such as methyl, phenyl, oxynaphthyl, oxynaphthyl-sulfonic acid, or the like.

Our present invention relates to the production of valuable new azo coloring-matters by causing two molecules of either the same or two different diazo compounds to act on the said guanidin derivatives.

We point out specifically that by the term "diazo compound" in the following specification we intend to denote a simple diazo compound as well as a diazotized amidoazo compound, such as diazoazobenzene, diazoazotoluene, or the like.

The new dyestuffs are alkaline salts of acids having the following general formula:

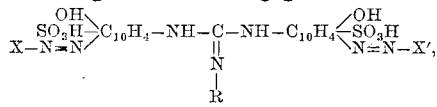

in which formula R means a hydrogen atom which can be replaced by a fatty or an aromatic radical, $-N=N-X$ and $-N=N-X'$, meaning either the same or two different radicals of diazo compounds, and which are from reddish-brown to dark-brown powders having a metallic luster, dissolving in water with from orange to bluish-red color. They dye unmordanted cotton from orange to bluish-red shades which are of a remarkable fastness to acids and to light.

In carrying out our new process practically we can proceed as follows, the parts being by weight: 24.2 parts of paraxylidin are diazotized in the usual manner with the aid of 78.4 parts of hydrochloric acid (of 15° Baumé) and fourteen parts of sodium nitrite. The resulting diazo solution is then slowly stirred into a solution prepared from 50.3 parts of dioxydinaphthyl guanidin disulfonic acid (prepared from the thio-urea compound of beta$_1$-amido-alpha$_3$-naphthol-beta$_4$-sulfonic acid) having the formula:

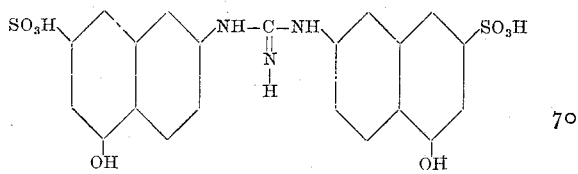

and one hundred and twelve parts of sodium carbonate, ($Na_2CO_3$.) After having stirred for several hours the formation of the dyestuff will be finished. The latter is separated from the mixture by the addition of common salt and isolated by filtration. The new coloring-matter thus obtained is the sodium salt of an acid having most probably the formula:

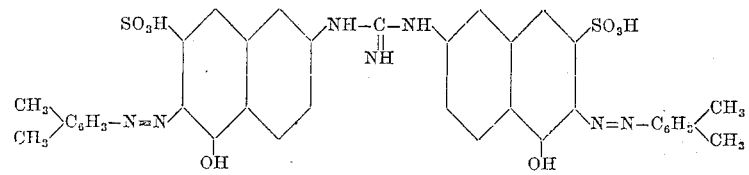

and is a reddish-brown powder having a metallic luster, soluble in water with a red color. It is insoluble in concentrated hydrochloric acid, while it is dissolved by concentrated sulfuric acid (of 66° Baumé) with a bluish-red color which is not changed on the addition of a small quantity of ice, while on the addition of a larger quantity of ice the dyestuff is precipitated in the shape of reddish-brown flakes.

The new coloring-matter dyes unmordanted cotton red shades which are fast to acids and and to light.

The process proceeds in an analogous manner if instead of the diazo compound mentioned in the example other diazo compounds are employed. On using, for instance, one molecule of diazotized anilin and one molecule of diazotized para-amidoacetanilid a red dyestuff and on using two molecules of alpha-naphthylamin a bluish-red dyestuff is obtained.

Having now described our invention and in what manner the same is to be performed, what we claim as new, and desire to secure by Letters Patent, is—

1. The process for producing new azo dyestuffs which process consists in first combining two molecules of diazo compounds with one molecule of a guanidin derivative having in a free state the herein-defined general formula:

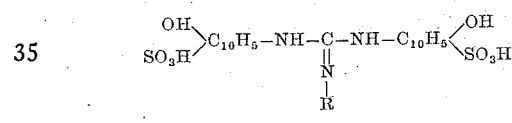

secondly precipitating the resulting dyestuffs by means of a suitable salt and finally isolating the same from the reaction mixture, substantially as hereinbefore described.

2. The process for producing a new disazo dyestuff which process consists in first combining two molecules of diazotized para-xylidin with one molecule of the dioxydinaphthyl-guanidin disulfonic acid having in a free state the formula:

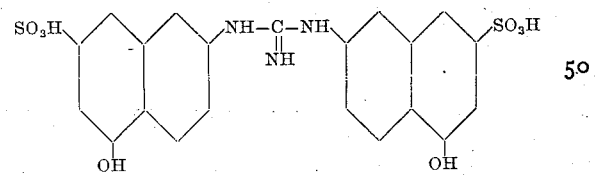

secondly precipitating the resulting dyestuff with the aid of a suitable salt, and finally isolating the same from the reaction mixture, substantially as hereinbefore described.

3. The herein-described new azo dyestuffs which are alkaline salts of acids having the hereinbefore-defined general formula:

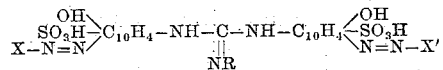

and which are from reddish-brown to dark-brown powders having a metallic luster, dissolving in water with from orange to bluish-red color, dyeing unmordanted cotton from orange to bluish-red shades which are of a remarkable fastness to acids and to light, substantially as hereinbefore described.

4. The herein-described new disazo dyestuff being an alkaline salt of an acid having most probably the following formula:

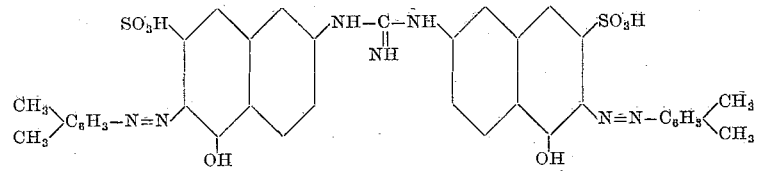

which in the shape of the sodium salt is a reddish-brown powder having a metallic luster, soluble in water with a red color, insoluble in concentrated hydrochloric acid and being dissolved by concentrated sulfuric acid of 66° Baumé with a bluish-red color which is not changed by the addition of a small quantity of ice, while on the addition of a larger quantity of ice the dyestuff is precipitated in the shape of reddish-brown flakes, dyeing unmordanted cotton red shades of a remarkable fastness to acids and to light, substantially as hereinbefore described.

In testimony whereof we have signed our names in the presence of two subscribing witnesses.

ADOLF ISRAEL.
RICHARD KOTHE.

Witnesses:
OTTO KÖNIG,
EMIL BLOMBERG.